United States Patent [19]

Jenkins

[11] Patent Number: 4,690,612

[45] Date of Patent: Sep. 1, 1987

[54] NUCLEAR REACTOR COOLANT PUMP IMPELLER/SHAFT ASSEMBLY

[75] Inventor: Leonard S. Jenkins, Plum Borough, Pa.

[73] Assignee: Westinghouse Electric Corp, Pittsburgh, Pa.

[21] Appl. No.: 761,447

[22] Filed: Aug. 1, 1985

[51] Int. Cl.$^4$ .................. F01D 11/00; G21C 15/00
[52] U.S. Cl. .................................. 415/112; 415/176; 376/402; 376/463
[58] Field of Search .............. 376/402, 404, 405, 463; 415/110, 175, 176, 115, 180, 112; 416/95; 418/86

[56] References Cited

U.S. PATENT DOCUMENTS

| | | |
|---|---|---|
| 2,402,841 | 6/1946 | Ray ..................... 415/175 |
| 2,936,715 | 5/1960 | Southam ................ 415/175 |
| 3,220,349 | 9/1964 | White .................. 415/115 |
| 3,756,742 | 9/1973 | Speck .................. 415/175 |
| 3,982,850 | 9/1976 | Jenkinson .............. 416/95 |

Primary Examiner—Frederick R. Schmidt
Assistant Examiner—Bradley I. Vaught

[57] ABSTRACT

A nuclear reactor coolant pump impeller/shaft assembly, including an impeller nut with a plurality of conduits formed therein in fluid communication with both ends of a passageway formed in the impeller nut in contact with a portion of the shaft, the fluid inlet and fluid outlet of the pump. Due to this conduit/passageway combination, coolant is effectively pumped into the passageway to heat the shaft to a temperature approximately equal to that of the impeller, thus creating thermal balance of the pump's component parts and providing improved pump efficiency.

8 Claims, 4 Drawing Figures

FIG. I.
(PRIOR ART)

NUCLEAR REACTOR COOLANT PUMP IMPELLER/SHAFT ASSEMBLY

BACKGROUND OF THE INVENTION

This invention relates to a pump and, more particularly, to a thermally balanced nuclear reactor coolant pump impeller/shaft assembly.

DESCRIPTION OF THE PRIOR ART

As described in commonly owned U.S. Pat. Nos. 4,426,620 and 4,434,132, and as shown in the simplified schematic view of FIG. 1 therein, a typical nuclear reactor, power supply apparatus 10 generally includes a nuclear reactor 12 and steam generators 14 and 16. The apparatus 10 also includes separate loops 18 and 20 for supplying coolant to the nuclear reactor 12. Each loop 18 and 20 includes the primary tubes 22 of the corresponding steam generator 14 and 16. Each loop 18 and 20 further includes a "hot" leg 24 through which coolant emanating from the nuclear reactor 12 is conducted to the inlet plenum 26 of each steam generator 14 and 16. While in the primary tubes 22, the hot coolant is in heat-exchange relationship with the feedwater supplied to each steam generator 14 and 16. Each loop 18 and 20 also includes a "cold" leg 28 through which the coolant, whose temperature has been reduced by the heat exchange, is returned to the nuclear reactor 12 from the outlet plenum 30 of each steam generator 14 and 16. Finally, each loop 18 and 20 includes a coolant pump 32 for driving the coolant therethrough.

Since the coolant pumps 32 are instrumental in cooling the nuclear reactor 12, the most efficient design and trouble-free operation of the cooling pumps 32 is greatly desired.

As shown in greater detail in FIGS. 2 and 3 herein, a conventional coolant pump 32 generally includes a housing or casing 34 and a solid shaft 36 located axially of the housing 34 for rotation therein. A thermal sleeve 38 (omitted from FIG. 4) surrounds a portion of the shaft 36. An impeller key 40 is interposed between the shaft 36 and an impeller or rotor 46 (FIG. 3). The impeller key 40 acts as a "backup" measure such that, if the impeller 46 becomes loosened from the shaft 36, the impeller key 40 prevents rotation of the impeller 46 relative to the shaft 36.

More particularly, the impeller 46 is the rotating member of the coolant pump 32 and generally includes a central, cylindrical hub 49, to which is attached a plurality of blades or fins 51 (FIG. 2). The impeller 46 is heated during installation about the shaft 36 to create a relatively tight tapered fit therebetween. The tapered mating area between the impeller 46 and the shaft 36 is indicated by reference numeral 47 (FIG. 3).

After the impeller 46 is installed on the shaft 36, a lockbolt 44 is placed through a central hole 45 formed in an impeller nut 42 and screws into the shaft 36 via right-hand threads 52 (FIG. 3). The impeller nut 42 also acts as a "backup" measure should the impeller 46 become loosened from its tapered fit with the shaft 36. That is, the impeller nut 42 is intended to prevent sudden expansion and backing off of the impeller 46 relative to the shaft 36. The lockbolt 44 and the impeller nut 42 are then welded together to ensure that the impeller nut 42 will not come off and that the impeller 46 is fixedly attached to the shaft 36.

The coolant pump 32, of course, also includes a fluid inlet 48 and a fluid outlet 50. During operation of the pump 32, coolant enters the fluid inlet 48, circulates across the outer surface of the impeller 46 in the direction indicated by arrow "A", and exits via the fluid outlet 50. In addition, an auxiliary flow is created through a conduit 53 formed in the impeller 46, in the direction indicated by arrow "B" (FIG. 3).

The temperature at the impeller 46 during operation of the coolant pump 32 is about 550° F. On the other hand, due to a required conventional heat exchanger (not shown), which is also a part of the coolant pump 32, the temperature at the thermal sleeve 38 is about 120°–150° F. The shaft 36 is similarly at a much lower temperature than the impeller 46.

Accordingly, a large thermal imbalance results between the impeller 46 and the solid shaft 36 during operation. This imbalance can cause the impeller 46 to expand relative to the cooler shaft 36, thus reducing the interface pressure between the impeller 46 and the shaft 36. As a result, the impeller 46 could loosen from its tapered fit with the shaft 36. If this occurs, the friction between these components, which previously carried the loads, is lost and unwanted stress is placed on the impeller key 4, the impeller nut 42 and the lockbolt 44.

Thus, the conventional nuclear reactor coolant pump impeller/shaft assembly exhibits a significant operational deficiency. The present invention is directed to overcoming this deficiency.

SUMMARY OF THE INVENTION

Accordingly, it is an object of the present invention to provide a pump having thermal balance among its component parts for improved operational efficiency.

It is another object of the present invention to provide a nuclear reactor coolant pump impeller/shaft assembly, wherein the tapered fit of the impeller relative to the shaft is reliably maintained.

It is another object of the present invention to provide a nuclear reactor coolant pump impeller/shaft assembly, wherein impeller/shaft compliance is improved so that thermal transients (generally impeller/shaft temperature differentials) have a reduced impact on impeller/shaft interface pressure relative to the conventional impeller/solid shaft assembly described above.

It is another object of the present invention to provide a nuclear reactor coolant pump impeller/shaft assembly, including a combination of conduits and passageways which effectively pumps coolant across the shaft.

Finally, it is an object of the present invention to provide a nuclear reactor coolant pump impeller/shaft assembly, wherein an existing coolant pump can be retrofitted with a plurality of conduits formed in the impeller nut in fluid communication with both ends of a passageway formed in the interior of the traditionally solid shaft and the pump inlet and outlet, thus assuring that the shaft interior is warmed.

To achieve the foregoing and other objects of the present invention and in accordance with the purpose of the invention, there is provided a nuclear reactor coolant pump impeller/shaft assembly, including an impeller nut having a plurality of conduits formed therein in fluid communication with both ends of a passageway formed in contact with the shaft, the pump fluid inlet and the pump fluid outlet. This combination of conduits and the passageway effectively pumps the coolant across the shaft.

Overall, the present invention allows warming of the interior of the shaft by introduction of the coolant thereto, thus creating thermal balance between the component parts of the pump and more efficient operation of the pump.

BRIEF DESCRIPTION OF THE DRAWINGS

The accompanying drawings, which are incorporated in and constitute a part of the specification, illustrate embodiments of the invention and together with the description, serve to explain the principles of the invention.

DESCRIPTION OF THE PREFERRED EMBODIMENTS

In contrast to the conventional nuclear reactor coolant pump impeller/shaft assembly described above, and shown in FIGS. 2 and 3, FIG. 4 illustrates the preferred embodiment of the present invention.

Figure 1:
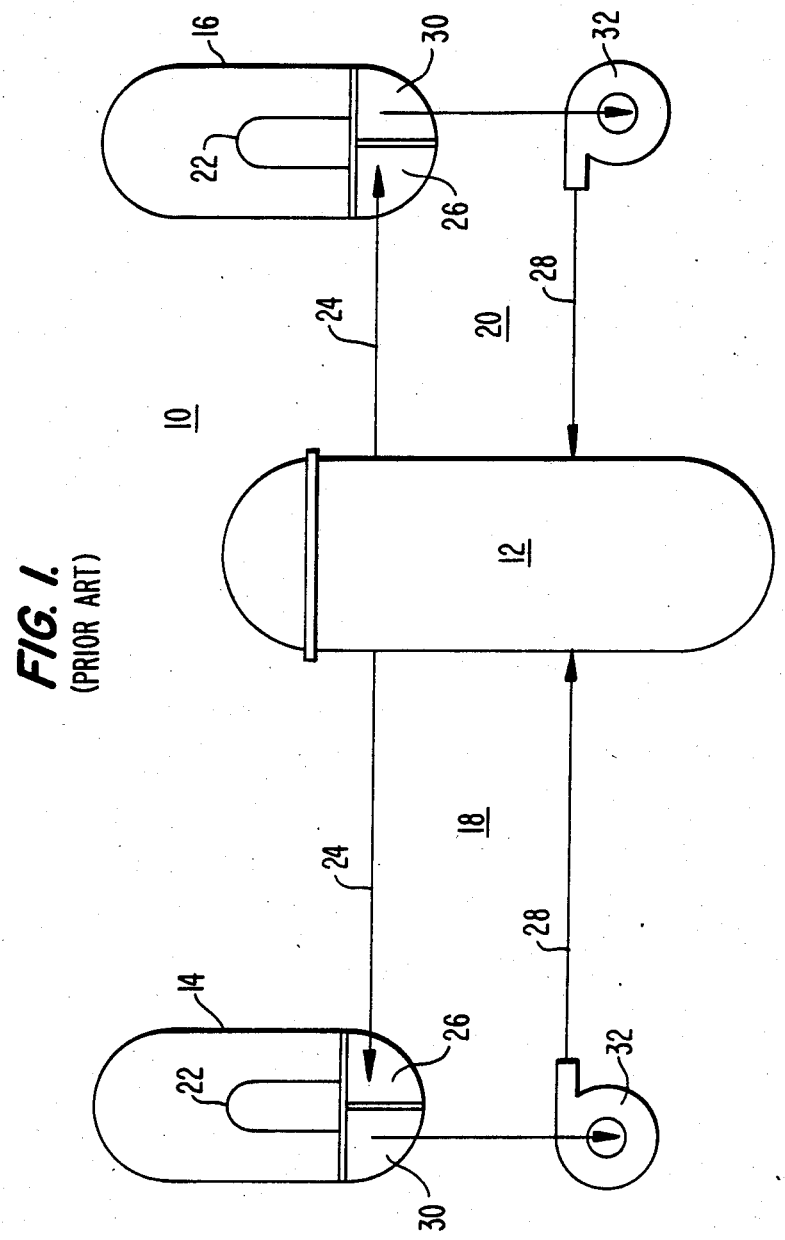
FIG. 1 is a schematic view of a conventional nuclear reactor, power supply apparatus, including coolant pumps.
Figure 2:
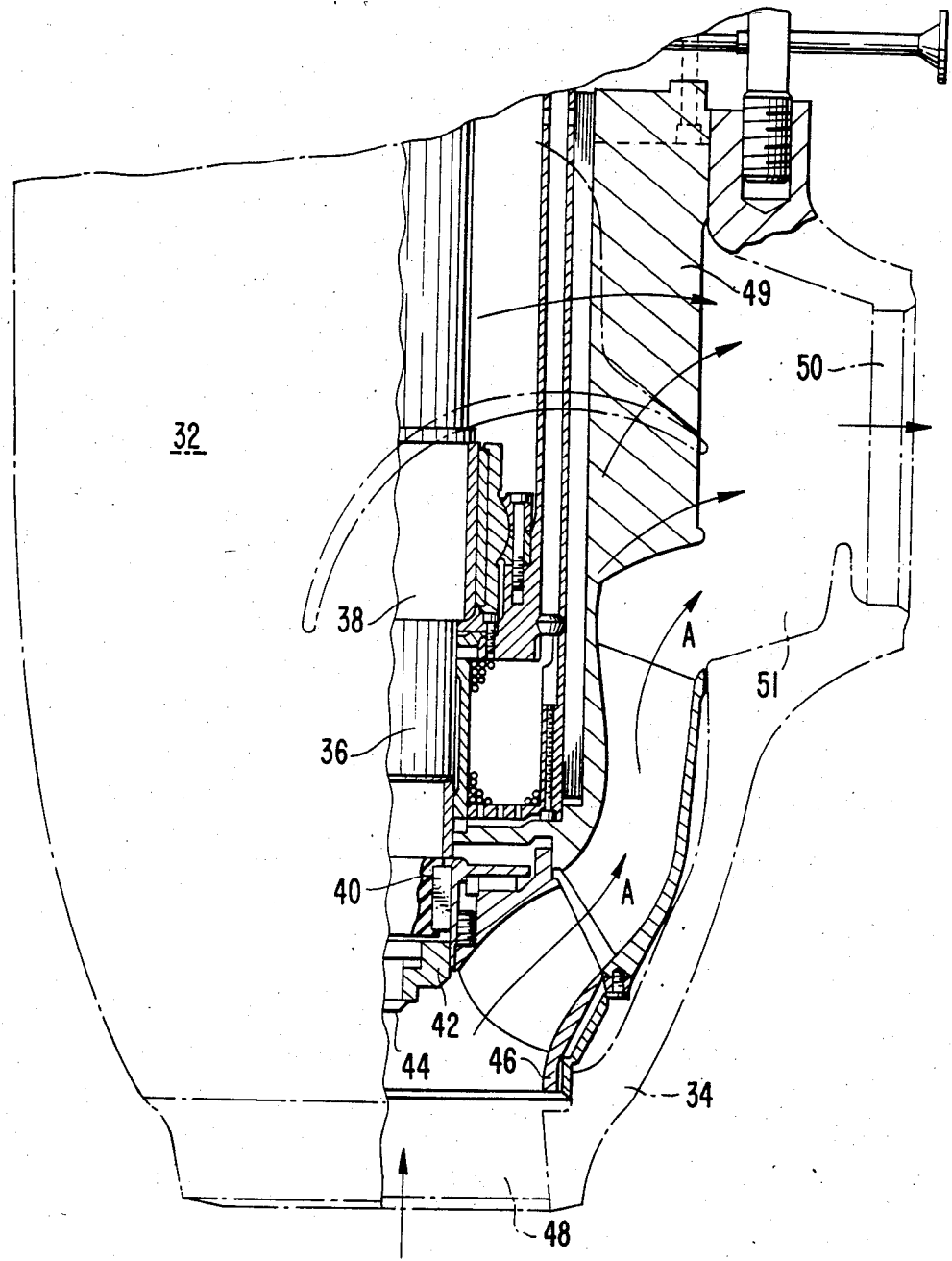
FIG. 2 is an elevational, cut-away, right side view of a conventional, nuclear reactor coolant pump.
Figure 3:
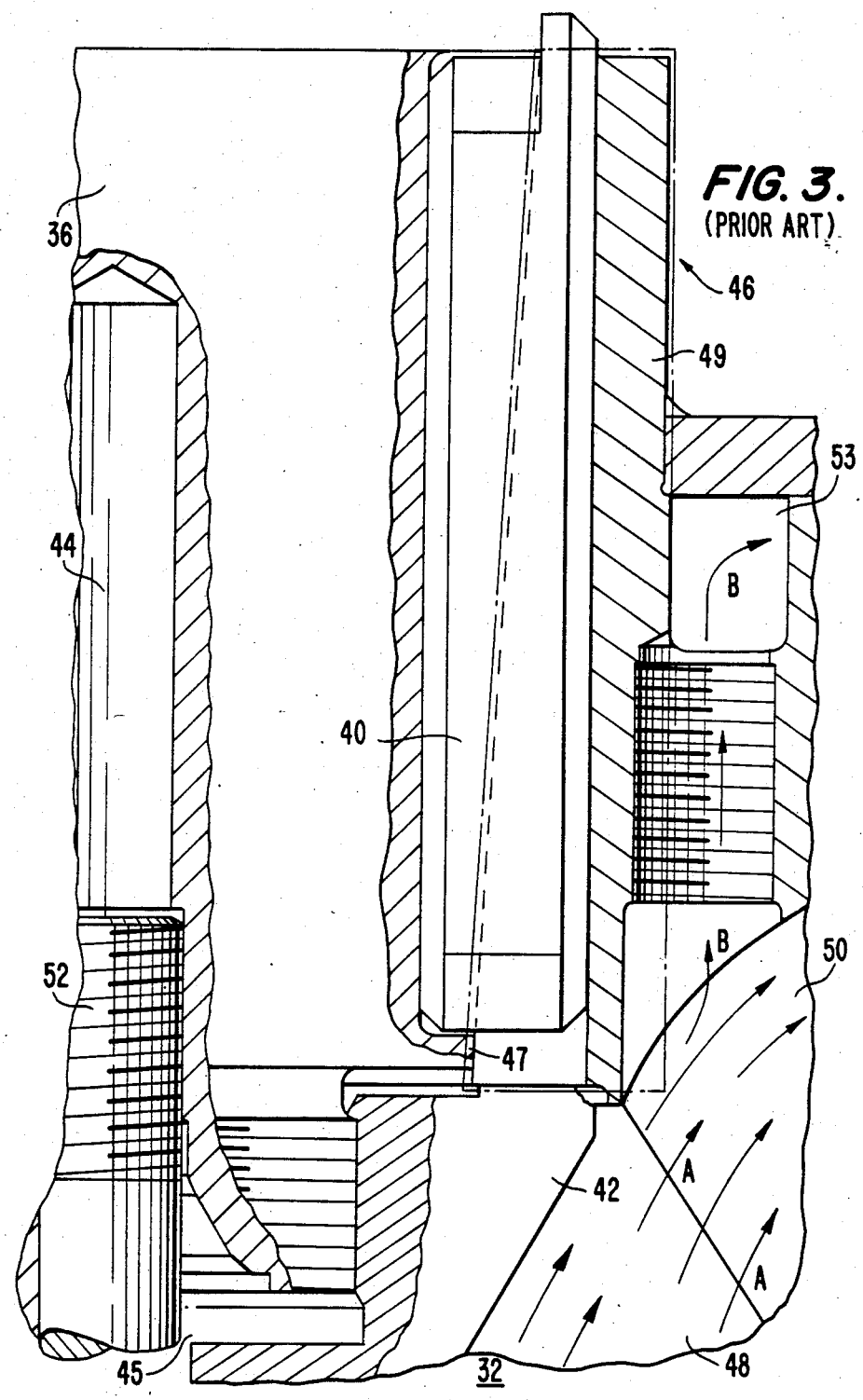
FIG. 3 is a cross-sectional, right side view of a conventional, nuclear reactor coolant pump impeller/shaft assembly.

More particularly, the nuclear reactor coolant pump 60 of the present invention generally includes a housing or casing (not shown in FIG. 4), which is unchanged from the conventional housing 34 shown in FIG. 2, and a shaft 64 located axially of the housing for rotation therein. The shaft 64 also includes a thermal sleeve, which is omitted from FIG. 4 for purposes of clarity in describing the present invention. An impeller key 66 is interposed between the shaft 64 and an impeller or rotor 72.

The impeller 72 generally includes a central, cylindrical hub 73 to which is attached a plurality of blades or fins (not shown). The impeller 72 is also heated during installation to create a relatively tight tapered fit on the shaft 64. The tapered mating area between the impeller 72 and the shaft 64 is indicated by reference numeral 75.

An impeller nut 68 and a lockbolt 70 are used to fixedly attach the impeller 72 to the shaft 64. More particularly, the impeller nut 68 has left-hand threads 69 which mate with the left-hand threads 71 formed in the shaft 64. The lockbolt 70 is inserted through a hole 77 formed centrally in the impeller nut 68 and anchors in the shaft 64 via right-hand threads 79. The lockbolt 70 and impeller nut 68 are then welded together after assembly to secure the impeller nut 68 and the impeller 62, as discussed above.

The impeller nut 68 includes at least one passageway 78 formed therein. Preferably, the at least one passageway 78 is formed in hole 77 between lockbolt 70 and impeller nut 68 and extends into contact with the exterior of the shaft 64 about the exterior of the impeller nut 68. The preferred number of the at least one passageway 78 is two; however, other numbers of passageways 78 are contemplated by the present invention.

Figure 4:
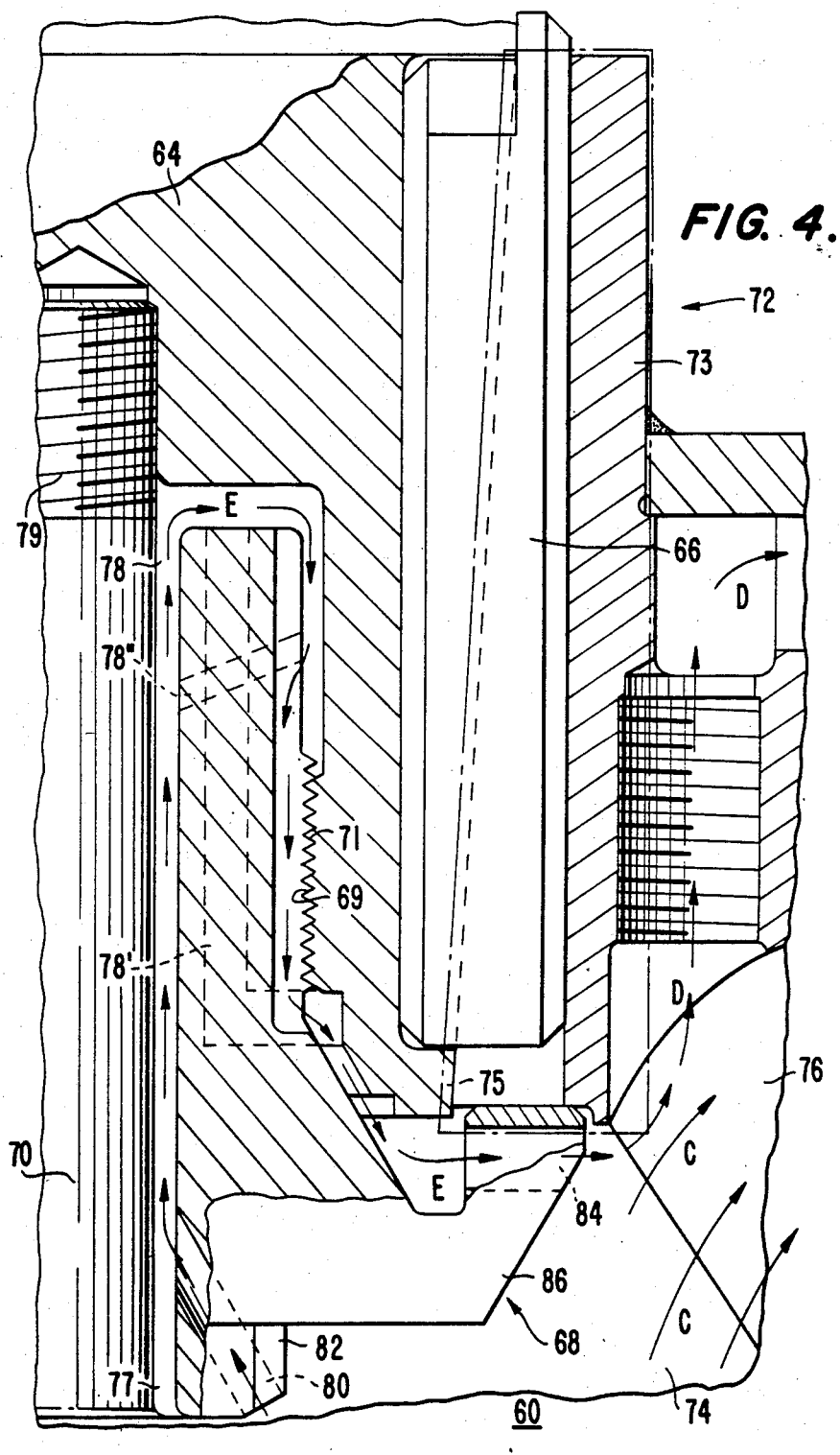
FIG. 4 is a cross-sectional, right side view of the nuclear reactor coolant pump impeller/shaft assembly according to the present invention, illustrating particularly the flow of coolant through the plurality of conduits formed in the impeller nut and the passageway formed in the impeller nut.

Alternatively, a portion of the at least one passageway 78 can be formed internally of the impeller nut 68, as indicated by reference numeral 78' in FIG. 4. In addition, at least one other passageway 78" can be formed, for example, skew to the passageway 78'.

A first plurality of conduits 80 is formed in a first area 82 of the impeller nut 68 and is in fluid communication with an end of the passageway 78. The preferred number of the first plurality of conduits 80 is six, although the present invention contemplates any practicable number of conduits. The preferred diameter of each of the first plurality of conduits is approximately ½ inch.

The impeller nut 68 also includes a second plurality of conduits 84 formed in a second area 86 thereof in fluid communication with the other end of the passageway 78. The preferred number of the second plurality of conduits 84 is four, although any practicable number can be used. The preferred diameter of each of the second plurality of conduits is ¾ inch.

The first plurality of conduits 80, passageway 78, and second plurality of conduits 84 must be of a sufficient size so that flow resistance in the form of friction between the water and conduits 80, passageway 78, and conduits 84 can be overcome. Proper sizing of the above-referenced passages guarantees a large enough flow to ensure that heat transfer from the water to the shaft interior is virtually independent of any external influences.

An important consideration in choosing the number and location of passageways 78 is effecting balance in the pump 60 during rotation of the shaft 64 and the impeller 72. Accordingly, equally spaced passageways 78 formed in opposing relation in the impeller nut 68 are preferred. The same consideration regarding "balance" is pertinent to formation of the first and second plurality of conduits 80 and 84, respectively, in the impeller nut 68.

The pump 60, of course, also includes a fluid inlet 74 and a fluid outlet 76. Coolant enters the fluid inlet 74 and circulates around the impeller 72 as indicated by arrow "C". In addition, an auxiliary flow, as indicated by arrow "D", is created through the impeller 72. In addition, because of: (1) the difference in the diameters and numbers between the first plurality of conduits 80 and the second plurality of conduits 84; (2) the fact that the pump 60 contains a continuous supply of fluid coolant, i.e., there are no voids or air gaps in the pump 60; and (3) the relatively long distance the fluid coolant must travel through the passageway(s) 78, 78' and 78", a pumping action is effectively created. More particularly, coolant is effectively pumped out of the larger, second plurality of conduits 84, through the path indicated by arrow "E" within the passageway(s) 78, 78' and 78" of the impeller nut 68, and in through the first plurality of conduits 80 from the main flow of coolant indicated by arrow "C".

It is to be understood that the above-described pumping action moving the coolant through the combination of conduits 80 and 84, and the passageway(s) 78, 78', 78" is exclusive of and is unaffected by the traditional pumping action of the coolant pump 60 across the impeller 72.

The temperature of the impeller 72 during operation of the coolant pump 60 of the present invention is again about 550° F. On the other hand, due to the pumping of coolant through the passageway(s) 78, 78' and 78" formed in the impeller nut 68 and into contact with the shaft 64, the temperature of the shaft 64 is made close or equal to that of the impeller 72. Accordingly, no thermal imbalance exists between the impeller 72 and the shaft 64. Therefore, the potential for expansion of the impeller 72 relative to the cooler shaft 64 and the possible loosening of the impeller 72 from its tapered fit with the shaft 64 is eliminated. Finally, the traditional, additional stress upon the impeller key, the impeller nut and the lockbolt caused by loosening is eliminated.

Accordingly, by providing a fluid passageway into contact with the shaft, the impeller/shaft assembly compliance is improved so that thermal transients (generally impeller/shaft temperature differentials) have a reduced impact on impeller/shaft interface pressure relative to the conventional impeller/solid shaft assembly with the same torque capacity at 70° F., as shown in the following Tables I and II.

TABLE I

Conventional Impeller/Solid Shaft Assembly -
Temperatures Observed During Steady State
and End of Ramp (E.O.R.) Heat-Up Conditions

|  | 557° F. Steady State | 557° F.* E.O.R. Heat Up |
| --- | --- | --- |
| Impeller Hub Average Temperature | 548.5° F. | 540.0° F. |
| Shaft Average Temperature | 537.6° F. | 511.5° F. |
| Hub/Shaft Δ T | 10.9° F. | 28.5° F. |

*100° F./hr. ramp.

TABLE II

The Present Invention
(for the same stated conditions as in Table I)

|  | 557° F. Steady State | 557° F.* E.O.R. Heat Up |
| --- | --- | --- |
| Hub/Shaft Δ T | 4° F. | 7° F. |

In addition, stress levels on the impeller hub 73 and shaft 64 are reduced according to the present invention, as shown in the following Table III.

TABLE III

Conventional Impeller/Solid Shaft Assembly Versus The Present
Invention: Comparison of Impeller Hub and Shaft Maximum
Stress Intensities for Assembly Conditions and Identical E.O.R.
Heat Up Torque Capacities (Stress Intensities at 70° F.)

| Hub/Shaft Model | Hub Stress Intensity* | Shaft Stress Intensity** |
| --- | --- | --- |
| Conventional Impeller/Solid Shaft Assembly | 19,243 psi | −10,535 psi |
| Present Invention |  |  |
| (Solid Section of Shaft) | 12,693 psi | −6,716 psi |
| (Passageway Section About Shaft) | 9,597 psi | −8,171 psi |

*At hub bore surface
**At shaft center or inside diameter

The present invention can also be used to improve an existing conventional, coolant pump impeller/shaft assembly without major modifications. That is, material can be removed from a conventional solid shaft 36 and a new impeller nut 68 and lockbolt 70 can be installed as taught by the present invention. Impeller/shaft interference fit can then be increased to bring the 70° F. torque capacity up to the original value (before modification) without an increase in impeller hub stress levels. Hot torque capacity will also increase significantly.

The foregoing is considered as illustrative only of the principles of the invention. Further, since numerous modifications and changes will readily occur to those skilled in the art, it is not desired to limit the invention to the exact construction and operation shown and described. Accordingly, all suitable modifications and equivalents may be resorted to, falling within the scope of the invention and the appended claims and their equivalents.

I claim as my invention:

1. A pump, comprising:
   (a) a casing having an inlet and an outlet in fluid communication for circulating fluid coolant through the pump;
   (b) a shaft positioned in the casing;
   (c) an impeller nut connected to the shaft;
   (d) a lockbolt fixedly connecting the impeller nut relative to the shaft;
   (e) passageway means with first and second ends for directing fluid from the lockbolt to the shaft;
   (f) first conduit means formed in the impeller nut in fluid communication with the first end of the passageway means and the inlet of the casing; and
   (g) second conduit means formed in the impeller nut in fluid communication with the second end of the passageway means and the outlet of the casing,
   wherein a portion of the fluid coolant circulating through the inlet of the casing is pumped through the first conduit means, through the passageway means, out the second conduit means and into the outlet of the casing.

2. The pump as recited in claim 1, wherein the passageway means is formed between an internal surface of the impeller nut and an external surface of the lockbolt and between an external surface of the impeller nut and an internal surface of the shaft.

3. The pump as recited in claim 2, wherein the passageway means includes a portion formed internally of the impeller nut.

4. The pump as recited in claim 3, wherein the passageway means includes a further portion formed internally of the impeller nut.

5. The pump as recited in claim 4, wherein the first conduit means includes a plurality of conduits.

6. The pump as recited in claim 4, wherein the second conduit means includes a plurality of conduits.

7. The pump as recited in claim 1,
   wherein the first conduit means is a first plurality of conduits, the second conduit means is a second plurality of conduits, and the passageway means is a plurality of passageways,
   wherein the diameter of each of the first plurality of conduits, each of the second plurality of conduits, and each of the plurality of passageways is sufficiently large to overcome flow resistance from internal friction, and
   wherein a pumping action is effectively created in the second plurality of conduits, the passageway means and the first plurality of conduits to pump the fluid coolant therethrough.

8. A nuclear reactor coolant pump impeller/shaft assembly, comprising:
   (a) a pump casing having an inlet and an outlet in fluid communication for circulating fluid coolant through the pump;
   (b) a shaft positioned in the casing;
   (c) an impeller nut abutting the shaft and having passageway means with first and second ends formed therein for directing fluid, the passageway means being in contact with a portion of the shaft, said impeller nut also having at least two first conduits formed therein in fluid communication with the first end of the passageway and the inlet of the casing, and at least two second conduits formed therein in fluid communication with the second end of the passageway and the outlet of the casing, wherein the diameter of each of the at least two first conduits is less than the diameter of each of the at least two second conduits and the number of the at least two first conduits is greater than the number of the at least two second conduits, and wherein a pumping action is effectively created in the at least two second conduits, the passageway and the at least two first conduits to pump the fluid coolant therethrough.

* * * * *